US012460223B2

(12) United States Patent
Liu et al.

(10) Patent No.: US 12,460,223 B2
(45) Date of Patent: *Nov. 4, 2025

(54) RESISTANCE GENES ASSOCIATED WITH DISEASE RESISTANCE IN SOYBEANS

(71) Applicant: Syngenta Crop Protection AG, Basel (CH)

(72) Inventors: Qingli Liu, Research Triangle Park, NC (US); Andrew David Farmer, Santa Fe, NM (US); Xiaoping Tan, Research Triangle Park, NC (US); Thomas Joseph Curley, Research Triangle Park, NC (US); Becky Welsh Breitinger, Research Triangle Park, NC (US); John Luther Dawson, Research Triangle Park, NC (US); John Daniel Hipskind, Research Triangle Park, NC (US); Robert Arthur Dietrich, Research Triangle Park, NC (US)

(73) Assignee: Syngenta Crop Protection AG, Basel (CH)

( * ) Notice: Subject to any disclaimer, the term of this patent is extended or adjusted under 35 U.S.C. 154(b) by 120 days.

This patent is subject to a terminal disclaimer.

(21) Appl. No.: 17/938,685

(22) Filed: Oct. 7, 2022

(65) Prior Publication Data

US 2023/0145612 A1 May 11, 2023

Related U.S. Application Data

(63) Continuation of application No. 16/765,717, filed as application No. PCT/US2018/061411 on Nov. 16, 2018, now Pat. No. 11,492,637.

(60) Provisional application No. 62/589,245, filed on Nov. 21, 2017.

(51) Int. Cl.
*C12N 15/82* (2006.01)
*C07K 14/415* (2006.01)

(52) U.S. Cl.
CPC ........ *C12N 15/8282* (2013.01); *C07K 14/415* (2013.01)

(58) Field of Classification Search
None
See application file for complete search history.

(56) References Cited

U.S. PATENT DOCUMENTS 8,669,414 B2 * 3/2014 Baley ........................ A01H 5/10 800/300
9,029,636 B2 5/2015 Wu et al.

FOREIGN PATENT DOCUMENTS

WO 2013/092275 A2 6/2013
WO 2014/117988 A1 8/2014
WO 2016/183130 A1 11/2015

OTHER PUBLICATIONS

Gao et al., MPMI, Oct. 2005, 18, 10, 1035-1045.
International Search Report for International Application No. PCT/US18/61411 mailed Mar. 26, 2019.
GenBank Accession No. HN847611.1 GS_Ba154104.F GS_Ba Glycine syndetika genomic 5-, genomic survey sequence, Oct. 25, 2010 [online], [Retreived from the Internet: <URL: https://www.ncbi.nlm.nih.gov/nucgss/HN847811.
UniProtKB—K7KQN0 (K7KQN0_SOYBN), Jan. 9, 2013 (online), [Retreived on Jan. 31, 2019], Retrieved from the internet: <URL: https:www.uniprot.org/uniprot/K7KQN0.
Langenbach, Caspar, et al: "Fighting Asian Soybean Rust", Frontiers in Plant Science; vol. 7 Jun. 7, 2016.
Soria-Guerra, Ruth Elena, et al: "Transcriptome analysis of resistant & susceptible genotypes of Glycine tomentella during Phakopsora pachyrhizi infection reveals novel rust resistance genes", Theoretical & Applied Genetics; Int. Jour. of Plant Breeding Res., Springer, Berlin, De; vol. 120(7), pp. 1315-1318, Jan. 8, 2010 (ISSN: 1432-2242).
European Supplementary Partial Search Report for EP Application No. 18882214.2 mailed Oct. 11, 2021.
Thornton et al—"From structure to function: Approaches and limitations"—Nature Structural Biology (Nov. 2000) Structural Genomics Supplement—pp. 991-994.
Kim et al.—"A 20 nucleotide upstream element is essential for the nopaline synthase (nos) promoter activity"—Plant Molecular Biology (1994) 24: —pp. 105-117.
Extended European Search Report for PCT/US2018/061411 mailed Mar. 18, 2022.

* cited by examiner

*Primary Examiner* — Medina A Ibrahim
(74) *Attorney, Agent, or Firm* — Suparna Kanjilal

(57) ABSTRACT

The present invention relates to methods and compositions for identifying, selecting and/or producing a Disease resistant soybean plant or germplasm using markers, genes and chromosomal intervals derived from *Glycine tomentella* PI441001, PI441008, PI446958, PI583970, or PI483224. A soybean plant or germplasm that has been identified, selected and/or produced by any of the methods of the present invention is also provided. Disease resistant soybean seeds, plants and germplasms are also provided.

38 Claims, 9 Drawing Sheets

Specification includes a Sequence Listing.

FIGURE 2

$$\mathrm{Log}_2\left(\frac{\text{Fungal B-tubulin transcripts of construct of interest}}{\text{CFP transcripts}}\right) - \mathrm{Log}_2\left(\frac{\text{Fungal B-tubulin transcripts of construct containing GUS}}{\text{CFP transcripts}}\right)$$

FIGURE 4

$$\mathrm{Log}_2\left(\begin{array}{l}\text{Fungal B-tubulin transcripts}\\ \text{of construct of interest}\end{array}\right) - \mathrm{Log}_2\left(\begin{array}{l}\text{Fungal B-tubulin transcripts}\\ \text{of construct containing GUS}\end{array}\right)$$

RESISTANCE GENES ASSOCIATED WITH DISEASE RESISTANCE IN SOYBEANS

RELATED APPLICATION INFORMATION

This application is a continuation application of application Ser. No. 16/765,717 filed May 20, 2020, which is a U.S. 371 of international application PCT/US2018/061411 filed Nov. 16, 2018, which claims the benefit of U.S. Provisional Patent Application No. 62/589,245 filed Nov. 21, 2017, the contents of which are incorporated herein by reference in their entirety.

FIELD OF THE INVENTION

The present invention relates to compositions and methods for identifying, selecting and producing enhanced disease and/or pathogen resistant plants using novel resistance genes.

STATEMENT REGARDING ELECTRONIC SUBMISSION OF A SEQUENCE LISTING

An amended Sequence Listing in ASCII text format, submitted under 37 C.F.R. § 1.821, entitled "81492-US-REG-C-P-1.xml_ST26 13.4 MB in size, generated on Oct. 5, 2022 and filed via EFS-Web is provided in lieu of a paper copy. This Sequence Listing is hereby incorporated by reference into the specification for its disclosures.

BACKGROUND

Plant pathogens are known to cause considerable damage to important crops, resulting in significant agricultural losses with widespread consequences for both the food supply and other industries that rely on plant materials. As such, there is a long felt need to reduce the incidence and/or impact of agricultural pathogens on crop production.

Several pathogens have been associated with damage to soybeans, which individually and collectively have the potential to cause significant yield losses in the United States and throughout the world. Exemplary pathogens include, but are not limited to fungi (e.g., genus *Phytophthora* and Asian Soybean rust *Phakopsora* pahyrhizi), nematodes (e.g., genus Meloidogyne, particularly, Meloidogyne *javanica*), and soybean stem canker. Given the significant threat to global food supplies that these pathogens present as well as the time and expense associated with treating soybean crops to prevent yield loss, new methods for producing pathogen resistant soybean cultivars are needed. What is needed is novel resistance genes (herein, "R-Genes") that can be introduced into commercial soybean plants to control soybean pathogens.

SUMMARY OF THE INVENTION

This summary lists several embodiments of the presently disclosed subject matter, and in many cases lists variations and permutations of these embodiments.

Compositions and methods for identifying, selecting and producing *Glycine* plants (including wild Glycines (e.g. *Glycine tomentella*) and *Glycine max* lines) with enhanced disease resistance are provided. Disease resistant soybean plants and germplasms are also provided. In some embodiments, methods of producing a disease resistant soybean plant are provided.

In one aspect of the invention there is provided a DNA construct that comprises a promoter that functions in plant cells operably linked to a novel resistance gene ("herein R-Gene). In yet another aspect of the invention there is provided a transgenic plant that contains the DNA construct, wherein the transgenic plant is resistant to soybean pathogens, particularly Asian Soybean Rust.

In another aspect of the invention is a method of preparing a fertile transgenic plant comprising providing a plant expression cassette comprising an R-Gene and contacting recipient plant cells with the plant expression cassette under conditions permitting the uptake of the plant expression cassette by the recipient cells; and selecting the recipient plant cells that contain the plant expression cassette; and regenerating plants from the selected recipient plant cells; and identifying a fertile transgenic plant that is resistant to soybean pathogens, particularly Asian Soybean Rust.

In another aspect of the invention there is provided a fertile transgenic plant that comprises a plant expression cassette comprising an R-Gene and wherein the plant is resistant to soybean pathogens, particularly Asian Soybean Rust.

In another aspect of the invention there is provided a method of controlling ASR in a field comprising the step of planting the seed from a plant comprising an R-gene of the invention.

Thus, it is an object of the presently disclosed subject matter to provide methods for conveying pathogen resistance into non-resistant soybean germplasm or plant lines.

Further the presently disclosed subject matter provides novel *Glycine max* lines comprising in its genome a R-gene that is derived from *Glycine tomentella* and further confers Asian soybean rust resistance (herein, 'ASR') in said novel *Glycine max* line. Soybean plants and/or germplasms identified, produced or selected by the methods of this invention are also provided, as are any progeny and/or seeds derived from a soybean plant or germplasm identified, produced or selected by these methods.

As still a further aspect, the invention encompasses transgenic plants comprising a plant cell, plant part, nucleotide sequence, expression cassette, vector and/or R-genes of the invention.

As a further aspect are seeds that produce the transgenic plants of the invention and seeds produced by the transgenic plants of the invention.

Also provided are harvested products derived from the transgenic plants of the invention, wherein the harvested product optionally comprises a nucleotide sequence, expression cassette, vector and/or R-gene of the invention. Further provided are processed products derived from the harvested products of the invention, wherein the harvested product optionally comprises a nucleotide sequence, expression cassette, vector and/or R-gene of the invention.

Still further, the invention provides as an additional aspect a method of producing a transgenic plant with increased resistance to a soybean pathogen. In embodiments, the method comprises introducing into a plant a polynucleotide, expression cassette, or vector of the invention, wherein the R-gene is expressed in the plant, thereby producing a transgenic plant with increased resistance to a soybean pathogen. Optionally, the introducing step comprises: (i) transforming a plant cell with the polynucleotide, expression cassette or vector and regenerating a transgenic plant; or (ii) crossing a first plant comprising the polynucleotide, expression cassette or vector with a second plant. In embodiments, the method further comprises producing a seed from the transgenic plant. In embodiments, the method further comprises obtaining a progeny plant from the transgenic plant, wherein the progeny plant comprises the polynucleotide, the expression cassette or the vector, expresses the R-gene and has increased resistance to a soybean pathogen.

As yet another aspect, the invention provides a method of producing a transgenic plant with increased resistance to a soybean plant pathogen (e.g., Asian Soybean Rust), the method comprising: (a) planting a seed comprising a polynucleotide, expression cassette or vector of the invention; and (b) growing a transgenic plant from the seed, wherein the transgenic plant comprises the polynucleotide, expression cassette or vector and produces the R-gene and has increased resistance to a soybean pathogen. In embodiments, the method further comprises: (c) harvesting a seed from the transgenic plant of (b), wherein the harvested seed comprises the polynucleotide, expression cassette, vector and/or the R-gene.

Still further, as another aspect, the invention provides a method of producing a seed. In embodiments, the method comprises: (a) providing a transgenic plant that comprises a polynucleotide, expression cassette or vector of the invention; and (b) harvesting a seed from the transgenic plant of (a), wherein the harvested seed comprises the polynucleotide, expression cassette or vector and/or a R-gene of the invention.

The invention further contemplates a method of producing a hybrid plant seed. In representative embodiments, the method comprises: (a) crossing a first inbred plant, which is a transgenic plant comprising a polynucleotide, expression cassette or vector of the invention with a different inbred plant, which may or may not comprise a polynucleotide, expression cassette or vector of the invention; and (b) allowing a hybrid seed to form.

The invention is also drawn to methods of using the polynucleotides of the invention, for example, in DNA constructs or expression cassettes or vectors for transformation and expression in organisms, including plants. The nucleotide or amino acid sequences may be native or synthetic sequences that have been designed for expression in an organism such as a plant.

In embodiments, the invention provides a method of using a polynucleotide, expression cassette or vector of the invention to produce a transgenic seed, where the transgenic seed grows a transgenic plant with increased resistance to a soybean pathogen.

The foregoing and other objects and aspects of the present invention are explained in detail in the drawings and specification set forth below.

BRIEF DESCRIPTION OF THE DRAWINGS

FIG. 2. Formula used to process the qRT-PCR raw reads.

BRIEF DESCRIPTION OF THE SEQUENCE LISTING

Figure 1:
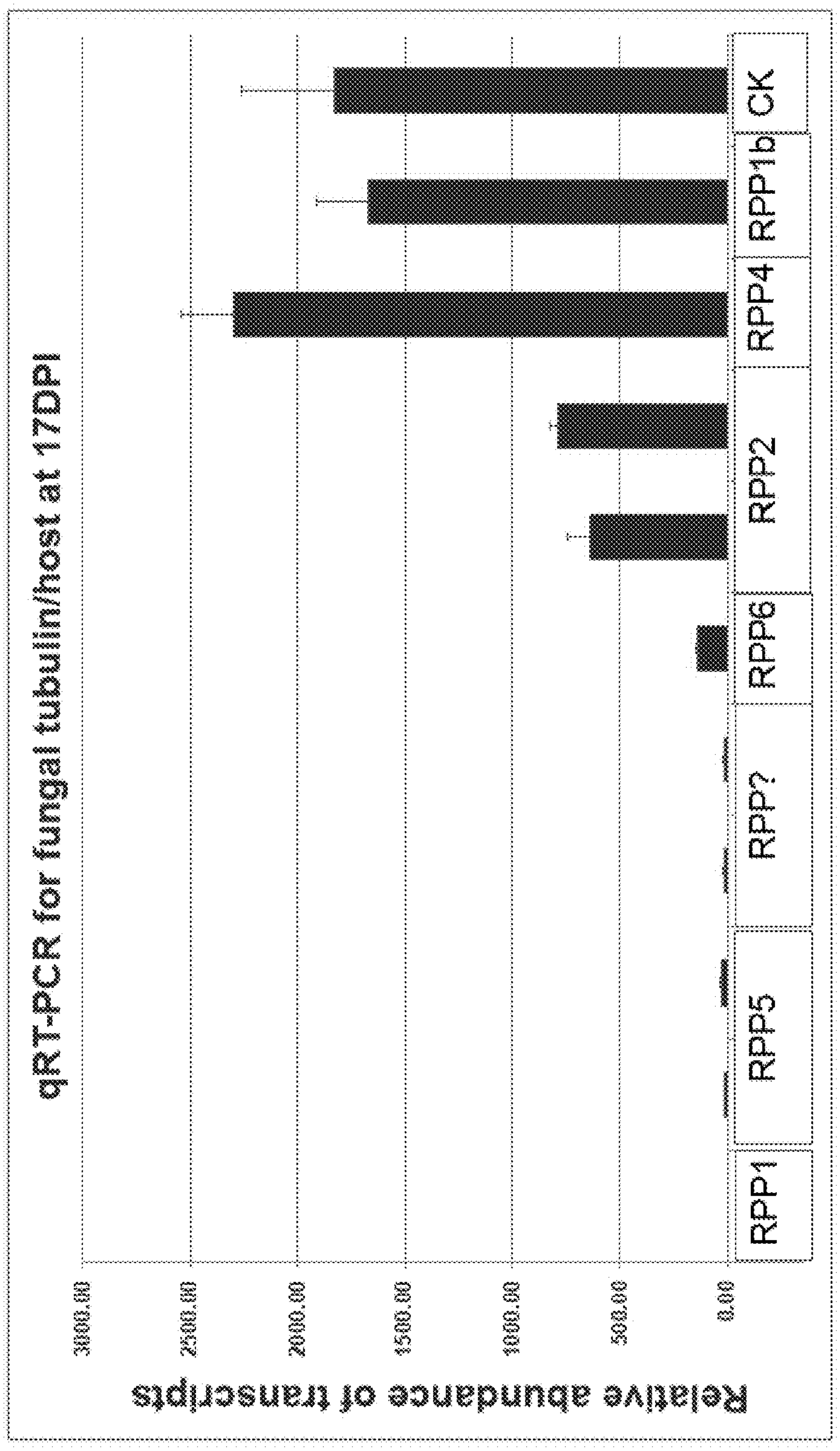
FIG. 1. qRT-PCR measurement of fungal b-tubulin of differential host panel. The measurement correlate well with the phenotypic ratings.

SEQ ID NOs: 1 & 2 are chromosomal intervals derived from *Glycine tomentella* line accession PI441001 referred to herein as “Scaffold 46840” and “Scaffold 49652” respectively. Scaffold 49652 has been mapped to *G. tomentella* chromosome 5 and Scaffold 46840 has been mapped to *G. tomentella* chromosome 5. SEQ ID NO. 3 is a chromosomal interval derived from *Glycine tomentella* line accession PI 483224 referred to herein as “Scaffold 002687F”. Scaffold 002687F has been mapped to *G. tomentella* chromosome 5. SEQ ID NO. 4 is a chromosomal interval derived from *Glycine tomentella* line accession PI 583970 referred to herein as “Scaffold 001084F”. Scaffold 001084F has been mapped to *G. tomentella* chromosome 5. SEQ ID NO: 5 is a chromosomal interval derived from *Glycine tomentella* line accession PI583970 herein referred to “Contig 000819F”. Contig (000819F has been mapped to *G. tomentella* chromosome 5. Genetic population mapping studies for PI441001, PI483224 and PI 583970 indicate that *Glycine tomentella* Chromosome 5 contains chromosomal intervals highly associated with ASR resistance (e.g. as corresponding to SEQ ID NOs: 1-5). Further data, also indicates that *Glycine tomentella* accessions PI446958, PI499939, PI505220, PI499933, PI441008, PI505256, PI446961 and PI483224 can be used as a source for said chromosomal intervals or genes corresponding to SEQ ID NOs 1-5.

These chromosomal intervals or portions thereof may be introduced (i.e. introgressed through use of embryo rescue & marker assisted breeding (MAB)) into *Glycine max* lines to create *Glycine max* lines resistant to various diseases such as ASR. Single nucleotide polymorphisms (SNP) within SEQ ID NOs 1-5 that are associated with ASR resistance are described in PCT Application No. PCT/US2017/036712, published as WO 2017/222827, incorporated herein by reference in its entirety.

Further research into the intervals led to the discovery of causative genes and associated native promoters and terminator sequences were identified from the above interval(s) located or corresponding to on *Glycine tomentella* Chromosome 5.

SEQ ID NO: 6 is a soy rust resistance gene from PI441001 encoding a protein containing Toll/Interleukin-1 receptor (TIR), nucleotide-binding site (NBS), leucine rich-repeat (LRR), and WKRY domains syntenic to Glyma.05G165800 (Soy_william82_v2) (Herein, a “TNLW” R-gene motif); associated native promoter comprises SEQ ID NO: 7 and terminator sequence comprises SEQ ID NO: 8. SEQ ID NO: 6 encodes the protein of SEQ ID NO: 47.

SEQ ID NO: 9 is a soy rust resistance candidate gene from PI441001 that encodes a protein containing coiled-coiled (CC), nucleotide-binding site (NBS), and leucine rich repeat (LRR) domains. The gene is syntenic to Glyma.05G165600 (Soy_william82_v2) (Herein, a “CNL” R-gene motif); associated native promoter comprises SEQ ID NO: 10 and terminator sequence comprises SEQ ID NO: 11. SEQ ID NO: 9 encodes the protein of SEQ ID NO: 48.

SEQ ID NO: 12 is a soy rust resistance candidate gene from PI583970 that encodes a protein having a CNL R-gene motif; associated native promoter comprises SEQ ID NO: 13 and terminator sequence comprises SEQ ID NO: 14. SEQ ID NO. 12 encodes the protein of SEQ ID NO: 42.

SEQ ID NO: 15 is a soy rust resistance candidate gene from PI583970 that encodes a protein having a CNL R-gene motif; associated promoter used to validate comprises SEQ ID NO: 16 and terminator sequence comprises SEQ ID NO: 17. SEQ ID NO. 15 encodes the protein of SEQ ID NO: 43.

SEQ ID NO: 18 is a soy rust resistance candidate gene from PI583970 that encodes a protein having a CNL R-gene motif; associated promoter used to validate comprises SEQ ID NO: 19 and terminator sequence comprises SEQ ID NO: 20. SEQ ID NO. 18 encodes the protein of SEQ ID NO: 49.

SEQ ID NO: 21 is a soy rust resistance candidate gene from PI446958 that encodes a protein having a CNL R-gene motif; associated promoter used to validate comprises SEQ ID NO: 22 and terminator sequence comprises SEQ ID NO: 23. SEQ ID NO: 21 encodes the protein of SEQ ID NO: 44.

SEQ ID NO: 24 is a soy rust resistance candidate gene from PI446958 that encodes a protein having a CNL R-gene motif; associated native promoter comprises SEQ ID NO: 25 and terminator sequence comprises SEQ ID NO: 26. SEQ ID NO: 24 encodes the protein of SEQ ID NO: 45.

SEQ ID NO: 27 is a soy rust resistance candidate gene from PI446958 that encodes a protein having a CNL R-gene motif; associated promoter used to validate comprises SEQ ID NO: 28 and terminator sequence comprises SEQ ID NO: 29. SEQ ID NO: 27 encodes the protein of SEQ ID NO: 46. Vector Construction for the R-Gene comprising SEQ ID NO: 27 was done using a forward primer comprising SEQ ID NO: 51 and a reverse primer comprising SEQ ID NO: 52.

SEQ ID NO: 30 is a soy rust resistance candidate gene from PI583970 that encodes a protein having a TNLW R-gene motif; associated native promoter comprises SEQ ID NO: 31 and terminator sequence comprises SEQ ID NO: 32. SEQ ID NO: 30 encodes the protein of SEQ ID NO: 50.

Further intervals have been discovered in other *Glycine tomentella* lines as depicted Table 1 below that are associated with ASR resistance and correspond to the intervals described above having/comprising SEQ ID NOs 1-5 and also located on chromosome 5. Interval mapping indicates that ASR resistance can be found in both T1 and T2 *Glycine tomentella* lines. Further, it is contemplated that any of the source lines listed in Table 1 can be used to introduce ASR resistance into elite Soybean plants either by way of plant introgression through embryo rescue or via transgenic expression of genes encoding a protein having a CNL or TNLW R-gene motif or a gene having between 70-100% homology to any of SEQ ID NOs: 6, 9, 12, 15, 18, 21, 24, 27, or 30. Contig/Scaffolds 001082F, 000221F, 000342F, 003716F, 001879F, 001273F, 000866F, 000819F and 49562 are depicted in SEQ ID NOs: 33, 34, 35, 36, 37, 38, 49, 40, and 41 respectively. It is contemplated that homologous sequences with functional ASR resistance genes related to the R-Genes as depicted in SEQ ID NOs: 6, 9, 12, 15, 18, 21, 24, 27 and 30 can be located in the intervals and associated sequences of Table 1.

TABLE 1

Listing of others sources and scaffolds found to comprise intervals associated with increased resistance to Asian Soybean Rust.

| Genome type | Line | Contig/ Scaffold | begin | end |
|---|---|---|---|---|
| T1 | PI505220 | s49652 | 47,538 | 2,464,073 |
| T1 | PI499933 | s49652 | 42,441 | 2,481,008 |
| T1 | PI441008 | 000207F | 1,000,000 | 1,400,000 |

TABLE 1-continued

Listing of others sources and scaffolds found to comprise intervals associated with increased resistance to Asian Soybean Rust.

| Genome type | Line | Contig/ Scaffold | begin | end |
|---|---|---|---|---|
| T1 | PI441008 | 000819F | Whole Contig | Whole Contig |
| T1 | PI441008 | 000866F | Whole Contig | Whole Contig |
| T1 | PI441008 | 001273F | Whole Contig | Whole Contig |
| T1 | PI441008 | 001879F | Whole Contig | Whole Contig |
| T1 | PI441008 | 003716F | Whole Contig | Whole Contig |
| T2 | PI449658 | 000342F | 108,327 | End of contig |
| T2 | PI449658 | 000221F | Whole Contig | Whole Contig |
| T2 | PI449658 | 001082F | Beginning of Contig | 629,163 |
| T2 | PI446961 | 000342F | Whole Contig | Whole Contig |
| T2 | PI446961 | 000221F | Whole Contig | Whole Contig |
| T2 | PI446961 | 001082F | Beginning of Contig | 369,453 |
| T2 | PI505256 | 000342F | 203,123 | End of contig |
| T2 | PI505256 | 000221F | Whole Contig | Whole Contig |
| T2 | PI505256 | 001082F | Beginning of Contig | 326,515 |

DETAILED DESCRIPTION OF THE INVENTION

The presently disclosed subject matter relates to compositions and methods for introducing novel resistance genes (herein, "R-Genes") into commercial soybean plants to control soybean pathogens. The methods involve transforming organisms with nucleotide sequences encoding the R-genes of the invention. The nucleotide sequences of the invention are useful for preparing plants that show increased resistance to soybean pathogens, particularly Asian Soybean Rust (herein, "ASR"). Thus, transformed plants, plant cells, plant tissues and seeds are provided. Compositions include nucleic acids and proteins relating to soybean pathogen resistant plants as well as transformed plants, plant tissues and seeds. Nucleotide sequences of the R-genes and the amino acid sequences of the proteins encoded thereby are disclosed. The sequences find use in the construction of expression vectors for subsequent transformation into plants of interest, as probes for the isolation of other R-genes, and the like.

EXAMPLES

The following examples are not intended to be a detailed catalog of all the different ways in which the present invention may be implemented or of all the features that may be added to the present invention. Persons skilled in the art will appreciate that numerous variations and additions to the various embodiments may be made without departing from the present invention. Hence, the following descriptions are intended to illustrate some particular embodiments of the invention, and not to exhaustively specify all permutations, combinations and variations thereof.

Example 1 Identification of ASR Resistant Wild *Glycine* Lines

Multiple wild *glycine* (*Glycine tomentella*) lines were evaluated for ASR resistance against sixteen rust strains collected across a diverse range of environments. The rust data were generated using single pustule derived isolates from USDA-ARS (FL Q09, FL Q12, LABR13, FLQ11) and field populations (FL Q15, FLQ16, RTP1, RTP2, Vero, BR01, BR02 and BR03), the screening was carried out in contained facilities. Of the *Glycine tomentella* lines screened for ASR resistance, the following *Glycine tomentella* lines showed broad resistance against all ASR strains tested: PI441001, PI483224, PI583970, PI446958, PI499939, PI505220, PI499933, PI441008, PI505256 or PI446961.

Figure 6:
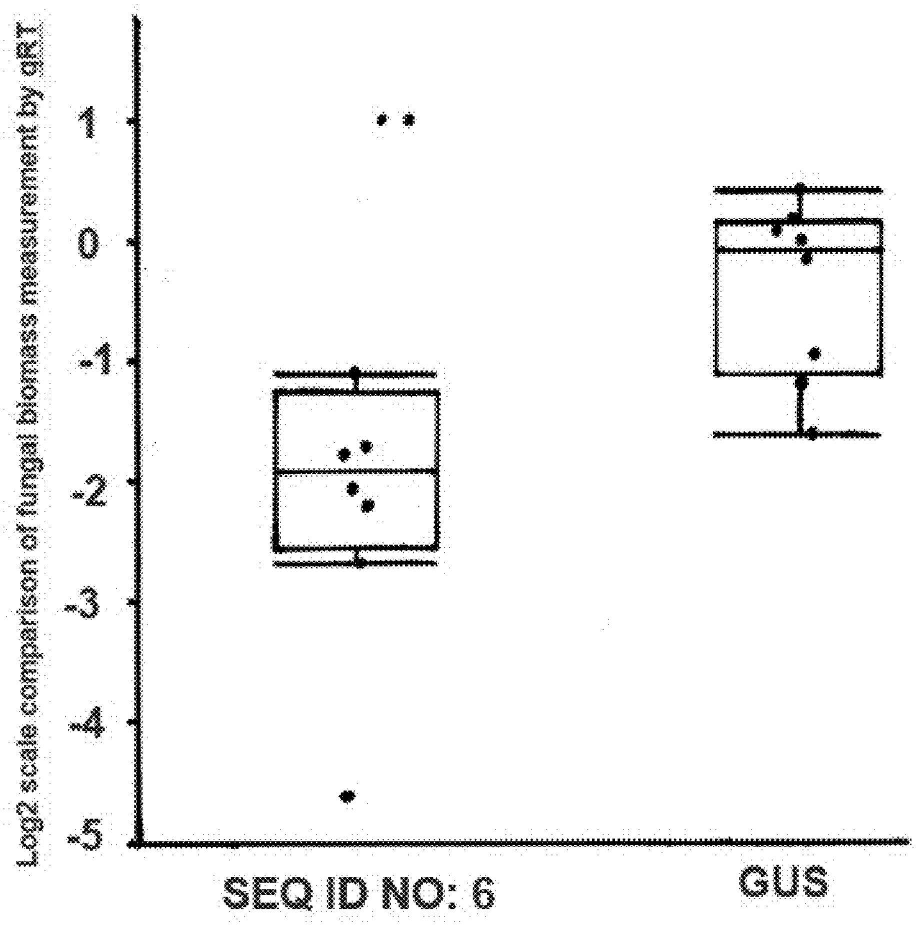
FIG. 6. Split leaf assay validation of SEQ ID NO: 6 showing significant disease reduction compared to check.

Each *Glycine tomentella* line was evaluated over a multiple day course of infection and rated at various time points using a rust rating scale based on groupings modified from Burdon and Speer, TAG, 1984 (see FIG. 6). Each *Glycine tomentella* accession was screened >2 times with ~4 plants each time in using a large diverse panel of rust isolates.

Example 2 Allele Mining & Associations to PI441001, PI441008, PI446958, PI583970, or PI483224 ASR Loci Resistant parent lines (i.e. PI441001, PI441008, PI446958, PI583970, and PI483224) were crossed with a susceptible *Glycine tomentella* line and F1 plants were generated (See Table 2). F1 plants were self-fertilized to generate F2 seed. F2 seed was harvested from the selfed F1 plant. Around 200 F2 seed were sown and leaf tissue from each plant was collected for genotyping studies. Each line was inoculated with Phakopsorapachyrhizito determine the resistance/susceptible phenotype of each F2 individual. Tissue from 50 resistant F2s and 50 susceptible F2s were combined in separate pools and genomic DNA was prepared from each pool. Illumina sequencing libraries were prepared from DNA for each of the pools and each library was sequenced in two Illumina HiSeq2000 2×100 bp Paired-End (PE) lanes. The average yield per sample was 383 million read pairs, which equals 77 gigabases of sequence per library. The sequencing reads were trimmed to remove bases with PHRED quality scores of <15.

Quality trimmed reads were aligned to the PI441001, PI441008, PI583970, and PI483224 reference genome sequence using GSNAP (WU and NACU 2010) as paired-end fragments. If a pair of reads could not be aligned together, they were treated as singletons for alignment. Reads were used in subsequent analyses if they mapped uniquely to the reference (≤2 mismatches every 36 bp and less than 5 bases for every 75 bp as tails).

SNPs were filtered prior to BSA analysis based on read depth, with SNPs having between 40 and 200× read depth being retained. A Chi-square test was used to select SNPs with significantly different read counts between the two alleles in the two pools. An empirical Bayesian approach (LIU et al. 2012) was used to estimate the conditional probability that there is no recombination between each SNP marker and the causal locus in both the resistant pool and in the susceptible pool. The probability of the linkage between the SNP and the causal gene is the geometric mean of these two conditional probabilities. Around 1000 SNPs were found to have possible linkage to the target locus. A subset of these putatively linked SNPs were used to fine map the locus using phenotyped F2 individuals. See references: LIU, S., C.-T. YEH, H. M. TANG, D. NETTLETON AND P. S. SCHNABLE, 2012 Gene Mapping via Bulked Segregant RNA-Seq (BSR-Seq). PLoS ONE 7: e36406 & Wu, T. D., and S. Nacu, 2010 Fast and SNP-tolerant detection of complex variants and splicing in short reads. Bioinformatics 26: 873-881.

TABLE 2

| Plant Crossings and Study Type | | | | |
|---|---|---|---|---|
| Species | PI# (male) | PI # (female) | Genome Size (Gb) | F2: Resistant to Susceptible Ratio |
| G. tomentella | PI441001 | PI441010 | 2 | 3:1 |
| G. tomentella | PI441001 | PI441011 | 2 | 3:1 |
| G. tomentella | PI441001 | PI441010 | 2 | 3:1 |
| G. tomentella | PI583970 | PI441007 | 2 | 3:1 |
| G. tomentella | PI583970 | PI441010 | 2 | 3:1 |
| G. tomentella | PI583970 | PI441011 | 2 | 3:1 |
| G. tomentella | PI448224 | PI441010 | 2 | 3:1 |
| G. tomentella | PI441008 | PI441010 | 2 | 7:9 |

1. PI441001 Data2Bio LLC (Ames, Iowa) Lab Methodology for gBSA-Seq Analysis for Tetraploid Soybean.

Chromosome discovery for causal loci in the tetraploid soybean population, PI441001 was carried out using Data2Bio's Genomic Bulked Segregant Analysis (gBSA) technology. It was theorized that ASR resistance is controlled by a single dominant allele. Four libraries were generated from DNA samples extracted from two susceptible tissue pools and two resistant tissue pools. These pools were then sequenced in eight (8) Illumina HiSeq2000 2×100 bp Paired-End (PE) lanes. A summary of the reference genomes used for subsequent analyses, read processing from raw data to quality trimming, alignment, SNP discovery and SNP impact are demonstrated in FIGS. 1-5 for population 441001. After various filtering steps 110,503 informative SNPs were identified in the PI441001 genome as being significantly associated with ASR resistance. A Bayesian approach was then used to calculate trait-associated probabilities. Next, physical maps of trait-associated SNPs (probability cutoff at 0.01) for the top contigs were created (FIG. 1). Two scaffolds, 46840 and 49652, were identified in PI441001 (SEQ ID NOs: 1 and 2 respectively). SNPs from these enriched scaffolds were mapped to the public *Glycine max* genome. In both populations, most of the SNPs from the top scaffolds clustered on small portions of Chr05 and Chr08 (see FIG. 4).

Figure 8:
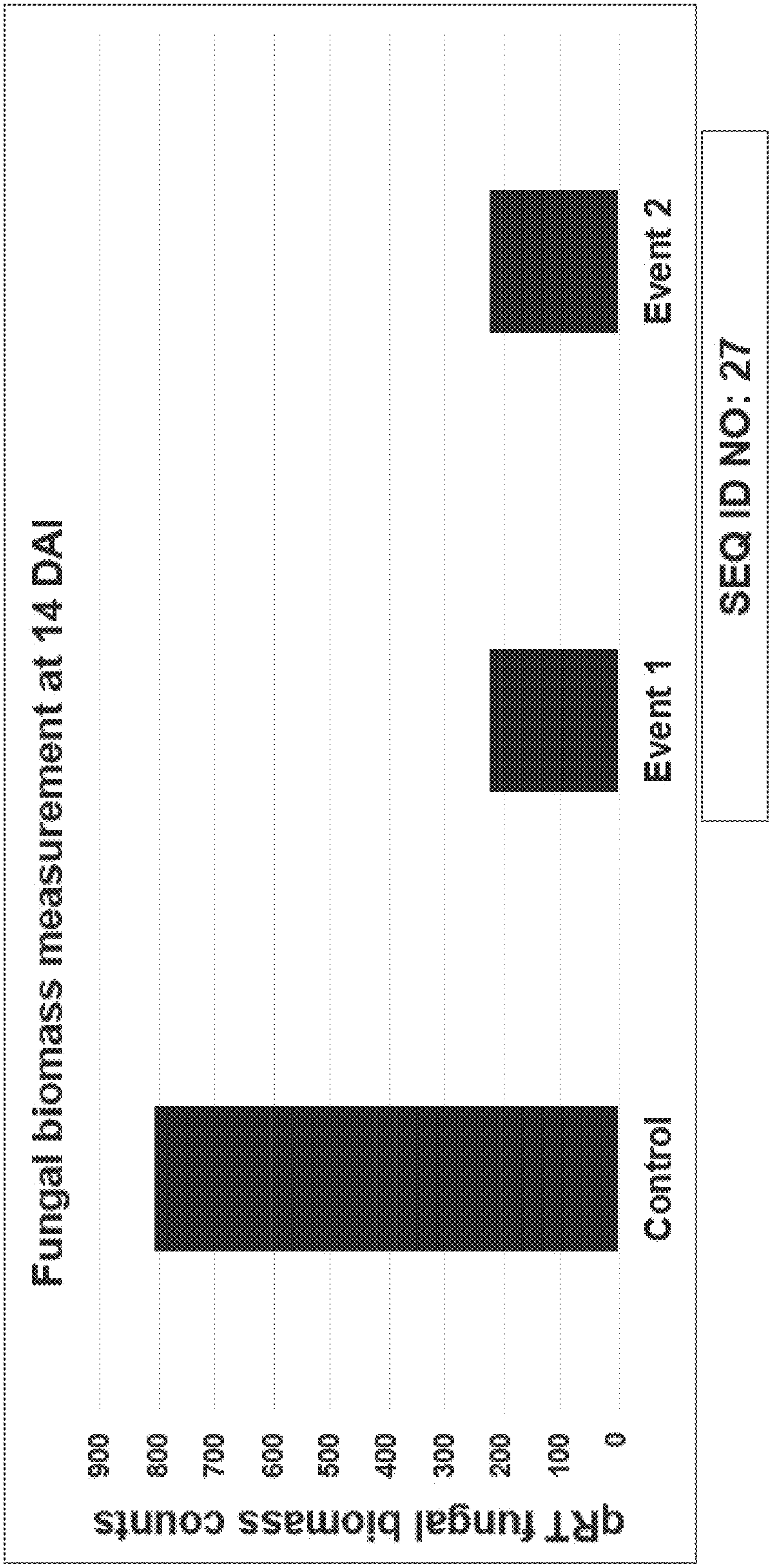
Figure 9:
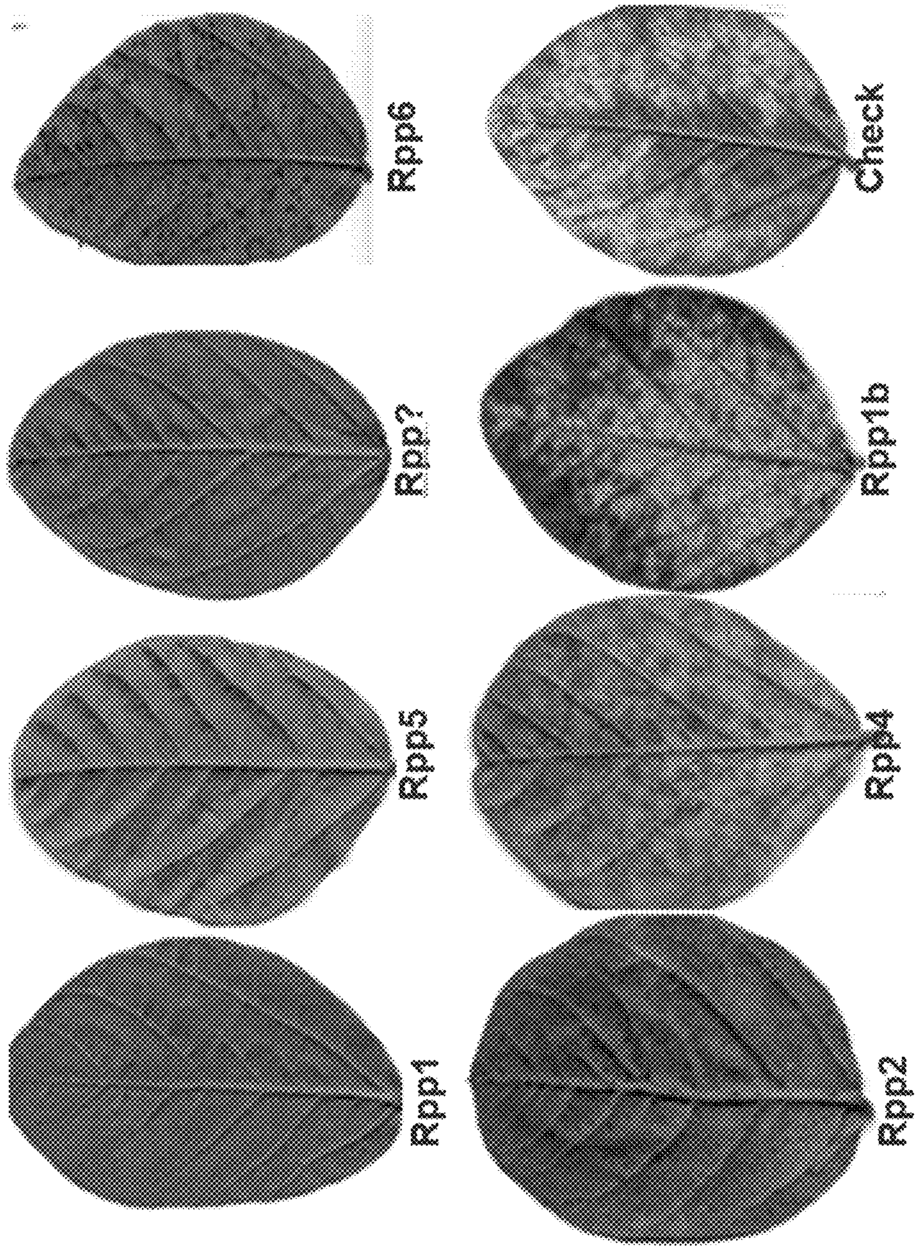
FIG. 9. Foliar symptoms correlating to qRT assay.

2. PI583970 Data2Bio LLC (Ames, Iowa) Lab Methodology for gBSA-Seq Analysis for Tetraploid Soybean Chromosome discovery for loci in the tetraploid soybean population, PI583970 was carried out using Data2Bio's Genomic Bulked Segregant Analysis (gBSA) technology. Two libraries were created from RNA samples extracted from one susceptible tissue pool and one resistant tissue RNA pool. After various filtering steps 59,014 informative SNPs were identified in the PI583970 genome that were significantly associated with ASR resistance. A Bayesian approach was then used to calculate trait-associated probabilities. Next, a physical map of trait-associated SNPs on contigs was created. The clustering of these SNPs suggests that the resistance loci is located in or near scaffold 000819F (see FIG. 7; Scaffold 001084F is SEQ ID NO: 4). The context sequences associated with these SNPs were also aligned to the public *Glycine max* genome to create a chromosome-level understanding of the mapping interval. The chromosomal positions of the trait-associated (ASR resistance) SNPs were then displayed graphically. Most of the SNPs from scaffold 001084F mapped and clustered on a small region of Chr05 (see FIG. 8). The data suggest that the loci responsible for ASR resistance maps within or near the interval 0.11 to 0.30 Mbp on scaffold 001084F (FIG. 9).

3. PI483224 Data2Bio LLC (Ames, Iowa) Lab Methodology for gBSA-Seq Analysis for Tetraploid Soybean Chromosome discovery for causal loci in the tetraploid soybean population, PI483224 was carried out using Data2Bio's Genomic Bulked Segregant Analysis (gBSA) technology. Two libraries were created from DNA samples extracted from one susceptible tissue pool and one resistant tissue pool (PI483224). After various filtering steps 428,263 informative SNPs were identified in the PI483224 genome to be significantly associated with ASR resistance. A Bayesian approach was then used to calculate trait-associated probabilities. Next, a physical map of trait-associated SNPs on contigs was created. The clustering of these SNPs indicates that the ASR resistance loci is located on or near scaffold 002687F (see FIG. 10). The context sequences associated with these SNPs were also aligned to the public *Glycine max* genome to create a chromosome-level understanding of the mapping interval. The chromosomal positions of the trait-associated (ASR resistant) SNPs were displayed graphically. Most of the SNPs from scaffold 002687F mapped to a small region of Chr05 (See FIG. 11). Data indicates that the ASR loci may map within or near the interval 0.17 to 0.36 MB on scaffold 002687F (see FIG. 12 and SEQ ID NO: 3).

Example 3 Embryo Rescue & Introgression of R Gene Intervals into *Glycine max* Lines Embryo rescue is performed (as described below) and chemical treatment to induce chromosome doubling is applied in order to generate amphidiploid shoots. If the amphidiploid plants are fertile they will be used to backcross with *Glycine max*. Backcrossing with *Glycine max* and subsequent embryo rescue will need to be performed for several generations in order to gradually eliminate the perennial *Glycine tomentella* chromosomes eventually resulting in ASR resistant *Glycine max* plant.

Wide crosses were carried out using Elite Syngenta soybean (*Glycine max*) lines (RM 3.7 to 4.8). The elite soybean lines are used as the females (pollen recipients) and multiple accessions of *Glycine tomentella* are used as the males or pollen donors. Selecting flowers from the *Glycine tomentella* plant containing anthers at the proper developmental stage is important. New, fully-opened, brightly colored flowers hold anthers with mature pollen. The pollen should appear as loose, yellow dust. These flowers are removed from the *Glycine tomentella* plant and crossed with the elite *Glycine max* plant for pollination. Pollen from the *Glycine tomentella* plants should be used within 30 minutes of flower removal. It is also important to identify and select elite soybean flower buds that are ready for pollination. A soybean flower bud is generally ready when it is larger in size when compared to an immature bud. The sepals of the soybean blossoms are lighter in color and the petals are just beginning to appear. First, use a pair of fine-tipped tweezers to carefully detach the sepals from the flower bud to expose the outer set of petals. Then, gently grasp and remove the petals (5 in total) from the flower exposing the ring of stamens surrounding the pistil. Since the stigma is receptive to pollen 1 day before the anthers begin shedding pollen it is important to recognize the stage development of "female ready, male not ready". When pollinating soybean flowers at this developmental stage it is not necessary to emasculate the female flower. Locate the stigma on the elite soybean flower. Then using 1 male flower, carefully peel off the petals to expose the anthers and gently dust the pollen grains onto the stigma of the soybean flower. Care should be taken not to damage the stigma at any time during this process. Starting the day after pollination a hormone mixture is sprayed onto the pollinated flower and eventual developing F1 pod 1× every day until harvest. The pollinated flower or pod is saturated with a light mist of the hormone mixture, taking care not to cause the flower/pod to prematurely detach from the plant. The mixture contains 100 mg GA3, 25 mg 1-Naphthaleneacetic acid (NAA) and 5 mg kinetin/L distilled water. Application of these hormones aid in the retention of the developing pod and in increased pod growth. The above described wide cross methodology results in success rates significantly higher than that reported in the literature. Further, no emasculation of female flowers is necessary, which saves time and reduces risk of damage to the stigma.

Harvest: Pods from wide crosses are harvested at approximately 14 to 16 days post pollination. (Harvest dates in the literature suggest 19 to 21 days, however the above method allows for faster harvest time and more robust pods). Pods are collected and counted according to wide cross combination to determine crossing success. The average crossing success across multiple soybean females and 5 different accessions of *Glycine tomentella* is approximately 40%. The wide cross pods can contain 1 to 3 seeds but generally 2 seeds are found in each F1 pod. The above described methodology allows for pod harvest at 14 to 16 days after pollination, ~5 days earlier than described in literature.

Embryo rescue: Harvested pods are collected and brought back to the lab to be sterilized. The pods are first rinsed with 70% EtOH for 2 to 3 minutes and then placed in 10% Clorox bleach for an additional 30 minutes on a platform shaker at approximately 130 RPM. Finally, the pods are rinsed multiple times with sterile water to remove any residual bleach. Embryo isolation can begin immediately following pod sterilization or pods can be stored at 4° C. for up to 24 hours prior to embryo isolation. The sterilized pods are next taken to a laminar flow hood where the embryos can be rescued. Individual pods are placed in a sterile petri dish and opened using a scalpel and forceps. An incision is made along the length of the wide cross pod away from the seed. The pod can then be easily opened to expose the seed. Alternatively, two pair of forceps can be used to separate the pod shell. Carefully remove the seed from the pod and place in a sterile petri dish under a dissection microscope. Very fine forceps are needed to isolate the embryo from the seed. With forceps in one hand, gently hold the side of the seed away from the embryo, with the hilum facing up. Use another pair of forceps in the other hand to remove the seed coat from the side of the seed containing the embryo. Peel off the membrane surrounding the embryo and push the embryo up from its bottom side. Embryos should be past the globular developmental stage and preferably past the early heart developmental stage (middle to late heart stage, cotyledon stage and early maturation stage embryos are desired). Isolated embryos are transferred to embryo rescue medium such as Soy ER1-1 (i.e. 3.1 g B5 basal salt, Gamborg's, 1 ml B5 vitamins 1000×, 40 g sucrose [C12H22011], 0.25 g casein hydrolysate, 0.25 ml BAP, 0.75 g MgCl2*6H20, 20 ml glutamine 25 mg/ml, 0.1 g serine [C3H7NO3], 4 ml Asparagine 25 mg/ml and 0.05 ml of IBA 1 mg/ml) Murashige and Skoog Medium (MS) and Gamborg's B-5 media (Bridgen, 1994) may also be used as embryo rescue medium. Embryos can be treated to induce chromosome doubling at this time. (See below for chromosome doubling details.) Isolated embryos remain on embryo rescue medium for 21 to 30 days at 24° C. Embryos may remain in the dark for the entire incubation on ER1-1, they also can be incubated in the dark and later completed in the light, or may spend the entire incubation in the light. There is not a callus induction stage in this protocol, shoots are developed directly from the embryos which allows for faster turnaround time, plantlet survival and better quality results. The above described embryo rescue method involves direct shoot regeneration from embryos, rather than regeneration through embryogenesis, thus making plant recovery quicker (shoot recovery in approximately 2-3 months, compared to reported up to 1 year timeline in the literature). Further, the following protocol does not require culture in the dark following transfer to germination medium nor does the above protocol require a transfer to rooting medium.

Chromosome doubling treatments: Either colchicine of trifluralin can be used to induce chromosome doubling. Ideally, late heart stage wide cross embryos (or larger) are chemically treated to induce chromosome doubling at any time from immediately following isolation up to 1 week post isolation. The doubling agent can be mixed in either solid or liquid medium and applied for several hours or up to a few days. Trifluralin is used at a concentration of 10-40 uM in either solid or liquid media. Alternatively, colchicine is used at a concentration of 0.4-1 mg/ml in either solid or liquid media. Following chemical treatment, embryos are transferred to fresh embryo rescue medium.

Shoot regeneration: Developing embryos are transferred from rescue medium to germination medium such as Soy ER GSMv2 (i.e. 3.2 g Schenk and Hilderbrandt Basal salt mixture, 1 g Myo-inositol [C6H1206], 5 ml Thiamine 1 mg/ml, 0.5 ml pyridoxine 1 mg/ml, 10 g sucrose [C12H22011], and 7.5 g purified agar) for approximately 3 to 5 weeks in the light at 24° C. Alternatively, developing embryos may be transferred from rescue medium to elongation medium such as Soy E1 0 No TCV (i.e. 4.3 g MS Basal salt Mixture [MSP01], 5 ml MS iron 200×, 30 g Sucrose [C12H22011], 1 g MES [C6H13NO4S], 8 g purified agar, 1 ml B5 vitamins 100×, 2 ml glutamine 25 mg/ml, 0.50 ml zeatin riboside, trans isomers 1 mg/ml, 0.1 ml IAA 1 mg/ml, 0.2 ml GA3 5 mg/ml, 1.5 ml timentin 100 mg/ml, 0.3 ml cefotaxime 250 mg/ml, 0.5 ml vancomycin 100 mg/ml) Shoots can be kept on medium for approximately 3 to 5 weeks in the light at 24° C. Developing shoots may be transferred from media plates to Phytocons containing either germination or elongation medium for further shoot development. Established shoots having suitable roots are moved to soil.

Ploidy Analysis: Ploidy analysis is conducted using a flow cytometer. Leaf tissue for ploidy analysis is collected from small shoots either in culture or after establishment in soil. Tissue is collected on dry ice and stored at −80° C. until analysis, or collected on wet ice and analyzed the same day. A sample size of 0.5 $cm^2$ is sufficient. Samples are prepared according to the instructions in the Sysmex kit (Sysmex Inc., Kobe Japan). Each sample set contains an untreated F1 plant (not treated to induce chromosome doubling) as a control.

Example 4 ASR Resistance Trait Introgression

Amphidiploid lines generated from the wide cross (i.e. *Glycine tomentella* crossed with *Glycine max*) followed by embryo rescue as described in Example 3 were backcrossed multiple times with a recurrent elite *Glycine max* lines. It is known in the art that multiple backcrosses are needed to generate fertile hybrid lines, in particular the literature suggests that a BC3 generation is necessary. In this case it was determined that an additional backcrosses are necessary, BC4 in the case of *G. tomentella*×*G. max* to generate fertile hybrid plants. F1 hybrid plants produced by the methods as described above were created from wide crosses comprising PI441001, PI441008, PI446958, PI583970, and PI483224. F1 plants were next crossed as a female with a male recurrent *G. max* plant to perform a first backcross (BC1 progeny). BC1 Progeny were further backcrossed for multiple generations (e.g. BC2). BC plants are evaluated for ASR resistance, chromosome numbers and in some cases lines are genotyped through use of molecular markers as described herein to detect the presence of chromosome intervals corresponding to SEQ ID NOs 1-5 or any marker identified in Tables 1-5.

Example 5 Identification of Two Causative Genes Located within *G. Tomentella* Chromosome 5 Intervals Further genotyping of the various *G. tomentella* intervals led to the discovery of two causative genes for ASR resistance located on chromosome 5 within the disclosed intervals. A first gene type encodes a TNLW R-gene motif and is depicted in SEQ ID NOs 6 and 30 located from PI441001 and PI583970 respectively. A second gene type located in the discovered intervals encodes a CNL R-gene motif and is depicted in SEQ ID NOs 9, 12, 15, 18, 21, 24, and 27. It is contemplated that any of these genes or homologs thereof can be employed in a transgenic, gene editing or breeding method utilizing embryo rescue as described above to generate plants having increased resistance to ASR.

Example 6 Construction of Vectors Comprising R-Genes

Constructs were generated comprising each of the R-genes described in Example 5 above.

A) Vector Construction for R-Gene Comprising SEQ ID NO: 6

Vector type: Binary Vector

Construct Size (bp): 30,982

Functional description: A binary vector for soybean transformation with ALS selection, harboring gGtoRG1-01, a candidate soy rust resistance gene encoding a protein containing Toll/Interleukin-1 receptor (TIR), nucleotide-binding site (NBS), leucine rich-repeat (LRR), and WKRY domains syntenic to Glyma.05G165800 (Soy_william82_v2).

Cloning methods: GenScript synthesized RG1 as four fragments RG1-PartI, -PartII, -PartIII and -PartIV [U9490BJ270-1 (23950), U9490BJ270-2 (23952), U9490BJ270-3 (23953), and U9490BJ270-4 (23954)]. The first and last 2 fragments were cloned into the bridge vector 21177 through SanDI/ScaI, ScaI/RsrII, respectively to obtain the intermediates 21177-PartI+II and 21177 Part-III+IV. Then the PartI+II (SanDI/ScaI), PartIII+IV (ScaI/RsrII) in the two intermediates were all cloned into 22296 at once through three way ligation at SanDI site of 22296. The positive clone was confirmed by digestion with Alw44I/NheI/SalI and by sequencing over the cloning junctions (SYN04455:65-78).

Sequences used include SEQ ID NO. 6 (coding sequence), SEQ ID NO. 7 (promoter) and SEQ ID NO. 8 (terminator). SEQ ID NO: 6 encodes the protein of SEQ ID NO: 47.

B) Vector Construction for R-Gene Comprising SEQ ID NO: 9

Vector type: Binary Vector

Construct Size (bp): 17,713

Functional description: A binary vector for soybean transformation with the ALS selection harboring a soy rust resistance candidate gene that encodes a protein containing coiled-coiled (CC), nucleotide-binding site (NBS), and leucine rich repeat (LRR) domains. The gene is syntenic to Glyma.05G165600 (Soy_william82_v2).

Cloning methods: GenScript synthesized RG2 as two fragments PartI (SanDI/SacI, U1935CD120-1,24076) and PartII (SacI/RsrII, U1935CD120-2, 24077), and ligated into 22296 at SanDI. The positive clone was confirmed by digestion with Alw44I/EcoRI and by sequencing over the cloning junctions (SYN04455:151-153)

Sequences used include SEQ ID NO. 9 (coding sequence), SEQ ID NO. 10 (promoter) and SEQ ID NO. 11 (terminator). SEQ ID NO: 9 encodes the protein of SEQ ID NO: 48.

C) Vector Construction for R-Gene Comprising SEQ ID NO: 12

Vector type: Binary Vector

Functional Description A binary vector for soybean transformation with glyphosate (EPSPS) selection harboring a soy rust resistance candidate gene from *G. tomentella* PI583970 that encodes a protein containing coiled-coiled (CC), nucleotide-binding site (NBS), and leucine rich repeat (LRR) domains expressed with native *G. tomentella* promoter and terminator(genomic DNA). The gene is syntenic to Glyma.05G165600 (Soy_william82_v2).

Sequences used include SEQ ID NO. 12 (coding sequence), SEQ ID NO. 13 (promoter) and SEQ ID NO. 14 (terminator). SEQ ID NO. 12 encodes the protein of SEQ ID NO: 42.

D) Vector Construction for R-Gene Comprising SEQ ID NO: 15

Vector type: Binary Vector

Construct Size (bp): 14,706

Functional description: Binary vector for soybean transformation with glyphosate selection (EPSPS), harboring a soy rust resistance candidate gene from *Glycine tomentella* (PI583970), cGtoRG13-01, encoding a protein containing coiled-coiled (CC), nucleotide-binding site (NBS), and leucine rich repeat (LRR) domains and driven by a soybean GmUbi promoter and *Arabidopsis* terminator plus a soybean kozak. The candidate gene is syntenic to Glyma.05G165600 (Soy_william82_v2).

Cloning methods: Site mutagenized U3962BF220-1 (prGmUBI1) so that the promoter fragment can be cut out using SanDI and BamHI (U1466CH300_6 by Genscript). Synthesized cGtoRG13 as a BamHI-SacI fragment (GS19921, U1466CH300_6 by Genscript), cut out the fragment. Three way ligation into 23899 between SanDI and Sac sites to get VC21449 New (SYN03277: 183). Verified the construct by digestion using SaII and ApaLI as well as by HincII alone, followed by sequencing (SYN03277:184-185).

Sequences used include SEQ ID NO. 15 (coding sequence), SEQ ID NO. 16 (prGmUbi1-01 Native Ubiquitin 1 promoter from soybean; Accession D16248.1) and SEQ ID NO. 8 (Terminator tAtUBQ3-02 A at 328 bp from tAtUbq3-01 (*Arabidopsis* Ubq3 3'-UTR). SEQ ID NO: 15 encodes the protein of SEQ ID NO: 43.

E) Vector Construction for R-Gene Comprising SEQ ID NO: 18

Vector type: Binary Vector

Functional Description A binary vector for soybean transformation with glyphosate (EPSPS) selection harboring a soy rust resistance candidate gene from *G. tomentella* PI583970 that encodes a protein containing coiled-coiled (CC), nucleotide-binding site (NBS), and leucine rich repeat (LRR) domains expressed with *Medicago truncatula* promoter and *Arabidopsis* termintor plus a soybean kozak. The gene is syntenic to Glyma.05G165600 (Soy_william82_v2).

Cloning Instructions See VC21449 . . . replace prGmUbi1-01 with prMt51186-03 promoter. Ligate as SanDI/RsrII gene cassette to the SanDI site of 23614. Or if possible swap promoter directly from binary (SanDI/BamHI) vector made in VC21449.

Sequences used include SEQ ID NO. 18 (coding sequence), SEQ ID NO. 19 (Promoter prMt51186-03 The promoter from the *Medicago truncatula* gene identified by the GeneChip probe ID Mtr.51186.1.S1) and SEQ ID NO. 20 (Terminator *Arabidopsis* Ubiquitin UTR). SEQ ID NO: 18 encodes the protein of SEQ ID NO: 49.

F) Vector Construction for R-Gene Comprising SEQ ID NO: 21

Vector type: Binary Vector

Construct Size (bp): 16,801

Functional description: Binary vector for soybean transformation with Glyphosate selection (cmEPSPS), harboring a genomic fragment derived from *Glycine tomentella* (PI446958), gGtoRG11-01, to express a soy rust resistance candidate gene encoding a protein containing a coiled-coil, nucleotide binding site, and leucine-rich repeat domain (CC-NBS-LRR) The soy rust resistance gene is syntenic to Glyma.05G65600 (Soy_williams82 v2).

Cloning methods: Digested U8867CG170-1 with SanDI/SacI to obtain RG11-PartI fragment (4899 bp), Digested U8867CG170-2 with SacI/RsrII/Eam11051 to obtain RG11-PartII fragment (2609 bp), ligated these two fragments onto 20660 at SanDI site. The resulting construct VC21209 was confirmed by digestion with Alw44I/EcoRI/Bsp1191 and by sequencing over the cloning junctions. (SYN04456:102-105). The resulting construct is 24160.

Sequences used include SEQ ID NO. 21 (coding sequence), SEQ ID NO. 22 (promoter) and SEQ ID NO. 23 (terminator). SEQ ID NO: 21 encodes the protein of SEQ ID NO: 44.

G) Vector Construction for R-Gene Comprising SEQ ID NO: 24

Vector type: Binary Vector

Functional Description Binary vector for soybean transformation to express the soy rust resistance candidate gene, cGtoRG11Ver221F, which encodes a protein containing a coiled-coil, nucleotide binding site, and leucine-rich repeat domain (CC-NBS-LRR). This gene is syntenic to Glyma.05G65600 (Soy_williams82 v2) and is derived from *Glycine tomentella* (PI446958) contig 221F allele, gGtoRG11-01. Expression is driven by the soybean Ubi1 promoter and *Arabidopsis* Ubq3 terminator. Vector utilizes Glyphosate selection (cmEPSPS).

Cloning Instructions Digest synthetic coding sequence (remove internal Sac site) with BamHI/SacI and ligate to the BamHI/SacI site of binary vector 24171 to replace the current CNL gene.

Note: promoter and terminator are the same as construct 24171

Sequences used include SEQ ID NO. 24 (coding sequence), SEQ ID NO. 25 (promoter) and SEQ ID NO. 26 (terminator). SEQ ID NO: 24 encodes the protein of SEQ ID NO: 45.

H) Vector Construction for R-Gene Comprising SEQ ID NO: 27

Vector type: Binary Vector

Allelic to CNL found in construct 24160. Identified by High Fidelity PCR amplification from PI446958 genomic DNA. Notebook Ref. SY04474:53

```
Forward Primer:
                                    (SEQ ID NO: 51)
GGATTATGTTTATATTCGAGTACATGCTATTGC

Reverse Primer:
                                    (SEQ ID NO: 52)
GGGATTCAAAGGCATCTTAGATTAGTCAAACATCC
```

Melting Temp: 98° C.
Annealing Temp: 58° C.
Elongation Temp: 72° C.
35 Cycles

PCR product was purified by agarose gel electrophoresis then sub-cloned into TOPO clone (PCR Blunt) vectors. Individual *E. coli* colonies were isolated on Kanamycin-LB selection media. Plasmid preps were prepared and the inserts sequenced.

Functional Description Binary vector for soybean transformation to express a soy rust resistance candidate gene, cGtoRG11Ver1F, which encodes a protein containing a coiled-coil, nucleotide binding site, and leucine-rich repeat domain (CC-NBS-LRR). This gene is syntenic to Glyma.05G65600 (Soy_williams82 v2) and is derived from *Glycine tomentella* (PI446958) contig 1F allele, similar to that of gGtoRG11-01. Expression is driven by the soybean Ubi1 promoter and *Arabidopsis* Ubq3 terminator. Vector utilizes Glyphosate selection (cmEPSPS).

Sequences used include SEQ ID NO. 27 (coding sequence), SEQ ID NO. 28 (promoter) and SEQ ID NO. 29 (terminator). SEQ ID NO: 27 encodes the protein of SEQ ID NO: 46.

I) Vector Construction for R-Gene Comprising SEQ ID NO: 30

Vector type: Binary Vector

Functional description: A binary vector for soybean transformation with ALS selection, haboring a candidate soy rust resistance gene encoding a protein containing a Toll-interleukin-like receptor (TIR), nucleotide binding site (NBS), leucine-rich repeat (LRR), WKRY domains syntenic to Glyma.05G165800 (Soy_william82_v2). Cloning methods: GenScript synthesized RG5 as four fragments RG5-PartI, -PartII, -PartIII and -PartIV [U9490BJ270-5 (23955), U9490BJ270-6 (23956), U9490BJ270-7 (23957), and U9490BJ270-8 (23958)]. The first 3 fragments were cloned into the bridge vector 21177 as SanDI+Kpn2I respectively to obtain the intermediate 21177-PartI+II+III. Then the PartI+II+III (SanDI/Kpn2I) from this intermediate vector and PartIV (Kpn2I/RsrII) were all cloned into 22296 at once through three way ligation at SanDI site of 22296. The positive clone was confirmed by digestion with NcoI/HindIII and by sequencing over the cloning junctions (SYN04455:65-78).

Sequences used include SEQ ID NO. 30 (coding sequence), SEQ ID NO. 31 (promoter) and SEQ ID NO. 32 (terminator). SEQ ID NO: 30 encodes the protein of SEQ ID NO: 50.

Example 7 Validation of R-Genes Against ASR

Validation of Molecular Assay Using Fungal b-Tubulin's Transcripts as Measurement of Resistance In our phenotyping work, we have used both symptom evaluation and molecular assays for rust resistance or susceptibility ratings. The symptom evaluation is a modified version of a rust rating scale from Burdon and Speer, TAG, 1984. The molecular assay is based on a fungal housekeeping gene, b-tubulin, identified by a Syngenta scientist, the probe for b-tubulin targets a specific region in soy rust but not in other pathogens or plant species. Further we validated this molecular assay coupled with phenotypic symptomatic observations as shown in FIG. 9 and FIG. 1. FIG. 9, from left to right, top to bottom, depicts complete resistance (Rpp1 line), a few lesions without sporulation (Rpp5 lines), lots of lesions with little sporulations (Rpp6 line), many lesions with some Tan lesions plus sporulations (Rpp2 lines), to many Tan leasions with profuse sporulations (Rpp4, Rpp1b and Jack). Because the rust used in this example is virulent on Rpp4 and Rpp1b, these 2 lines show susceptibility as severe as the susceptible check, Jack.

Consistent with these observations, measurements taken using fungal b-tubulin transcripts shown in the graph of FIG. 1, from left to right, no detection of the transcripts (complete resistance, Rpp1 line), barely detectable level of transcripts (a few lesion without sporulation, Rpp5 and Rpp6 lines), low level of transcripts (lots of lesions with little sporulations, Rpp6 line), intermediate level of transcripts (many lesions with some Tan lesions/sporulations, Rpp2 lines), high level of transcripts (many Tan leasions with profuse sporulations, Rpp4, Rpp1b and Jack (CK) lines).

From these data sets, we have shown that a molecular assay using fungal b-tubulin or other housekeeping genes is as reliable and indicative as phenotypic symptomatic ratings, and provides higher resolution than phenotypic ratings based on symptoms.

Validation of Transient Foliar Gene Expression System Using Known Soy Rust R Gene A transient detached split-leaf assay was developed to validate rust resistance. This was accomplished by using a susceptible soybean, or its wild relatives, leaf and transiently expressing a GUS control vector on one side of the leaf and transiently expressing a vector containing an R-gene on the other side of the leaf (i.e. the leaf midrib being the divider, further the control and experimental vectors being similar except for the respective CDS (GUS or R-gene)). After 2-3 days of infiltration, leaves were sprayed with rust. At about 10-17 days, infiltrated leaves were selected and cut in half by the mid-vein divider. Left side (top view) of each leaf with only infiltrated area was cut out and filled in 1 well in a 96 well block, labeled as construct left-1. The right side (top view) of the leaf was cut out and filled in one well, the right half leaf filled the other, 8 pair of wells per construct. In each experiment, the right side of the leaves was infiltrated with construct containing GUS, while the left side was infiltrated with the constructs of interests. For GUS check, it means both sides of the leaf were infiltrated with constructs containing GUS. All of them were analyzed for fungal biomass measurement using quantitative polymerase chain reaction of fungal b-tubulin transcripts.

First we validated the system with GUS (in construct 17282) as negative check and CcRpp1 (soy rust R gene from *Cajanus cajan* in construct 23677). The CcRpp1 showed near 100% disease control in stable transgenic soybean when in homozygous state and protein level reach certain level (Kawashima et al., 2016 for soy rust resistance from pigeon pea). It is appropriate to be used as positive control for system validation. Both GUS and CcRpp1 constructs were co-infiltrated with construct 18515, a CFP construct for transformation efficiency measurement.

In quantitative reverse transcript polymerase chain reactions, three ways to process the data using transcripts of fungal b-tubulin and CFP. One could use CFP as transformation efficiency measurement. In this setting, the formula in FIG. 2 was used.

Figure 3:
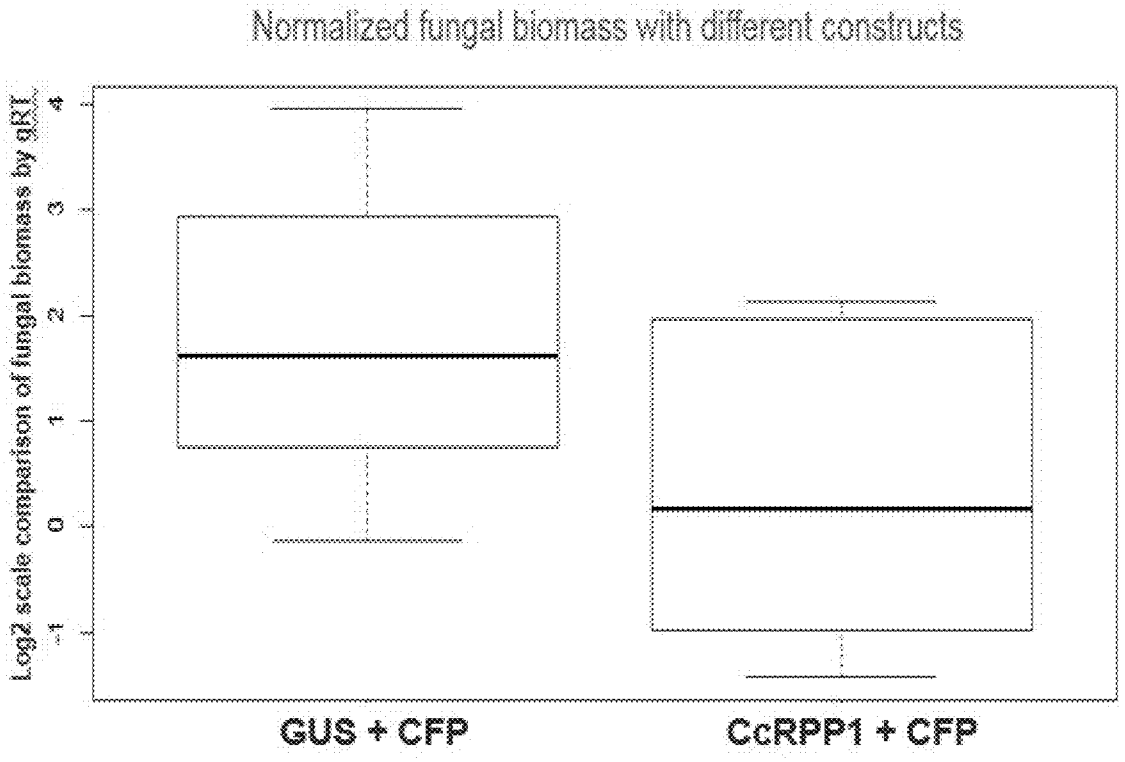
FIG. 3. Normalized fungal biomass with different constructs using known resistance gene CcRpp1 to validate the split leaf system FIG. 4. Alternate formula used to process the qRT-PCR raw reads.

As shown in FIG. 3, construct containing CcRpp1 has significant less normalized fungal biomass accumulation compared to construct containing GUS at 95% confidence, while GUS check is not significant different from 1 which means amount of fungal biomass accumulated from two sides infiltrated with GUS are not statistically different. While the construct containing CcRpp1 infiltrated half leaves produced significantly less amount compared to the side infiltrated with construct containing GUS. This experiment was repeated once, and similar results obtained. In all experiments, a Syngenta elite line or *Glycine canescens* line was used. From this experiment, one with ordinary skill could argue that other soybean lines or close related legumes could be used as well.

We also tested the system without CFP transformation efficiency control. In this experiment, we compared constructs containing GUS, CcRpp1, and CNL from 583970 (construct 24230). 24230 is derived from genomic DNA amplied using primers designed from contigs 819F containing coiled-coiled nucleotide binding and leucine rich repeat (CNL). In this experiment, we tested if CFP transformation efficiency check can be skipped or not. Because there is not CFP in this experiment, the formula in FIG. 4 was used to process the transcript data for any given constructs.

Figure 5:
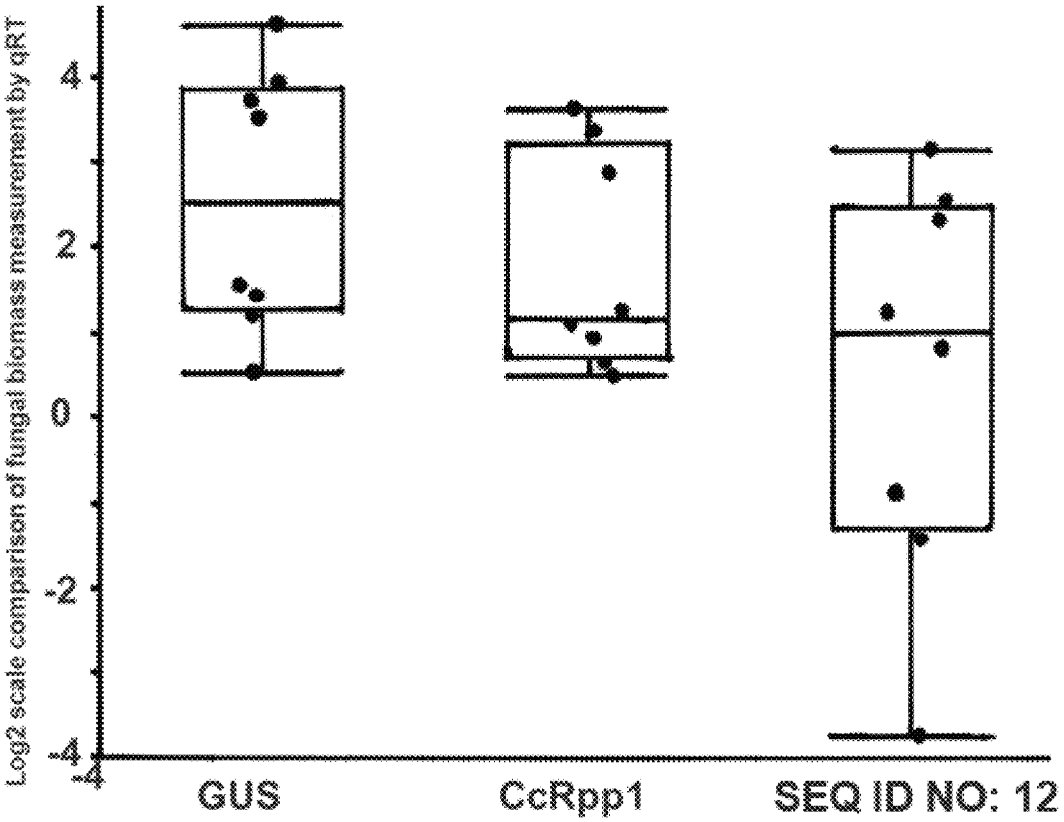
FIG. 5. Split leaf assay validation using CcRpp1, and a construct comprising SEQ ID NO: 12 showed significant disease reduction compared to the check.

As shown in FIG. 5, both CcRpp1 and 24230 (SEQ ID NO: 12) showed efficacy in rust resistance when compared to GUS negative check. But surprisingly, the 24230 appears more efficacious than CcRpp1. This may be due to the fact that CcRpp1 expression level is not sufficiently high to confer full resistance as it does in stable transgenics. However, it does reinforce the observation that the split leaf foliar expression is sufficient to detect resistance function.

We further tested other GUS construct as negative control. In this experiment, construct 21349 (GUS), and 24230 (CNL R gene from PI 583970, SEQ ID NO: 12) were used. As shown in FIG. 6, two sets of samples derived from 24230 are lower in fungal biomass than 21349. In this setting, we compared fungal b-tubulin from the side infiltrated with construct of interest directly to the other side infiltrated with construct containing GUS without normalization, except the value of transcript reads were processed by Log 2. Again the side infiltrated with construct 24230 showed significantly lower fungal biomass than the side infiltrated with construct containing GUS.

We also tested another construct, 23969 together with GUS check. 23969 contains another candidate gene in the chr 5 interval, encoding Toll inter-leukin nucleotide binding and leucine rich repeat protein with WRKY domain (TNLW). This resistance conferred by the gene in this construct is evident as indicated by significantly lower level of fungal biomass than GUS negative check (FIG. 6).

Stable Transformation with ASR Candidate Gene Vectors

Figure 7:
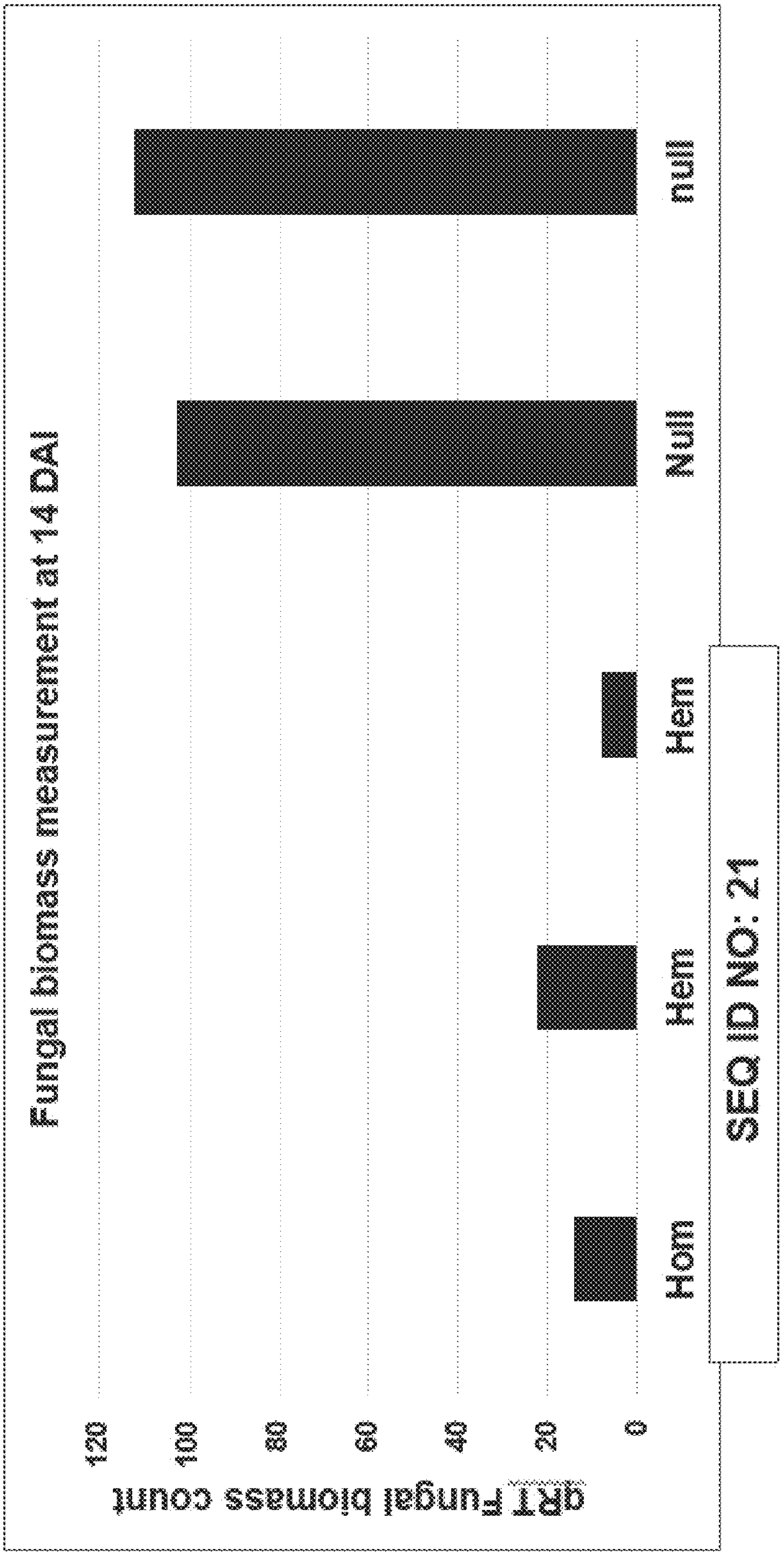
FIG. 7. Stable transformation (T1 events) results showing three events carrying SEQ ID NO: 21 delivering about 80% disease control. The bar is graphed as average of fungal b-tubulin transcripts FIG. 8. Stable transformation (T0 events) results showing two events carrying SEQ ID NO: 27 conferring resistance to soybean rust.

*Agrobacterium tumefaciens* strains containing individual binary vector with PAT, ALS or EPSPS selectable marker gene and one or more of the soybean rust resistance candidate genes was transformed into explants prepared from imbibed soybean seeds as prepared by method described here (Khan 2004, U.S. Patent Application Publication No. 20040034889). Soybean seeds were selected from Jack, Williams 82 or a Syngenta elite variety such as 06KG 218440. FIGS. 7 and 8 show the data for stable transformants at the T1 (SEQ ID NO: 21) and TO stage (SEQ ID NO: 27).

From the above data set, we have a reason to believe that both genes in the interval, CNL and TNLW, confer resistance to soybean rust. It would be reasonable to stack them to examine the resistance conferred by both genes together, a stronger resistance could be expected.

The above examples clearly illustrate the advantages of the invention. Although the present invention has been described with reference to specific details of certain embodiments thereof, it is not intended that such details should be regarded as limitations upon the scope of the invention except as and to the extent that they are included in the accompanying claims.

Throughout this application, various patents, patent publications and non-patent publications are referenced. The disclosures of these patents, patent publications and non-patent publications in their entireties are incorporated by reference herein into this application in order to more fully describe the state of the art to which this invention pertains.

From the above data set, we have a reason to believe that both genes in the interval, CNL and TNLW, confer resistance to soybean rust. It would be reasonable to stack them to examine the resistance conferred by both genes together, a stronger resistance could be expected.

The above examples clearly illustrate the advantages of the invention. Although the present invention has been described with reference to specific details of certain embodiments thereof, it is not intended that such details should be regarded as limitations upon the scope of the invention except as and to the extent that they are included in the accompanying claims.

Throughout this application, various patents, patent publications and non-patent publications are referenced. The disclosures of these patents, patent publications and non-patent publications in their entireties are incorporated by reference herein into this application in order to more fully describe the state of the art to which this invention pertains.

SEQUENCE LISTING

The patent contains a lengthy sequence listing. A copy of the sequence listing is available in electronic form from the USPTO web site (https://seqdata.uspto.gov/docdetail?docId=US12460223B2). An electronic copy of the sequence listing will also be available from the USPTO upon request and payment of the fee set forth in 37 CFR 1.19(b)(3).

The invention claimed is:

1. A transgenic *Glycine max* plant cell having, stably incorporated into its genome, a heterologous nucleic acid molecule comprising a polynucleotide encoding a protein having at least 90% sequence identity across the full length of SEQ ID NO: 47 operably linked to a plant active promoter, wherein expression of the protein in the transgenic *Glycine max* plant cell enhances Asian Soy Rust (ASR) resistance of the transgenic *Glycine max* plant cell compared to a control plant cell not expressing the protein.

2. A transgenic *Glycine max* plant having, stably incorporated into its genome, a heterologous nucleic acid molecule comprising a polynucleotide encoding a protein having at least 90% sequence identity across the full length of SEQ ID NO: 47 operably linked to a plant active promoter, wherein expression of the protein in the transgenic *Glycine max* plant enhances Asian Soy Rust (ASR) resistance of the transgenic *Glycine max* plant compared to a control plant not expressing the protein.

3. A *Glycine max* seed of the transgenic *Glycine max* plant of claim 2, wherein the *Glycine max* seed comprises the heterologous nucleic acid molecule stably incorporated into its genome.

4. A harvested product derived from the *Glycine max* seed of claim 3, wherein the harvested product comprises the heterologous nucleic acid molecule.

5. A processed product derived from the harvested product of claim 4, wherein the processed product is a flour, a meal, an oil, a starch, or a product derived from any of the foregoing, and wherein the processed product comprises the heterologous nucleic acid molecule.

6. A method of producing an Asian Soybean Rust (ASR) resistant *Glycine max* plant comprising the steps of:

a. contacting a recipient *Glycine max* plant cell with a heterologous nucleic acid molecule comprising a polynucleotide encoding a protein having at least 90% sequence identity across the full length of SEQ ID NO: 47 operably linked to a plant active promoter, wherein said heterologous nucleic acid molecule is incorporated into the genome of the recipient *Glycine max* plant cell;

b. regenerating the recipient *Glycine max* plant cell into a transgenic *Glycine max* plant; and c. assaying the transgenic *Glycine max* plant for resistance to ASR.

7. An ASR resistant *Glycine max* plant obtained by the method of claim 6, wherein the ASR resistant *Glycine max* plant comprises the heterologous nucleic acid molecule.

8. The ASR resistant *Glycine max* plant of claim 7, wherein the *Glycine max* plant is an elite *Glycine max* plant.

9. The elite *Glycine max* plant of claim 8, wherein the *Glycine max* plant further has increased resistance to any one of the following: soy cyst nematode, bacterial pustule, root knot nematode, frog eye leaf spot, phytopthora, brown stem rot, nematode, smut, Golovinomyces *cichoracearum, Erysiphe cichoracearum, Blumeria graminis, Podosphaera xanthii, Sphaerotheca fuliginea, Pythium ultimum, Uncinula necator, Mycosphaerella pinodes, Magnaporthe grisea, Bipolaris oryzae, Magnaporthe grisea, Rhizoctonia solani, Phytophthora sojae, Schizaphis graminum, Bemisia tabaci, Rhopalosiphum maidis, Deroceras reticulatum, Diatraea saccharalis, Schizaphis graminum* or *Myzus persicae*.

10. The transgenic *Glycine max* plant of claim 2, wherein said protein has at least 95% sequence identity across the full length of SEQ ID NO: 47.

11. The transgenic *Glycine max* plant of claim 10, wherein said protein has at least 98% sequence identity across the full length of SEQ ID NO: 47.

12. The transgenic *Glycine max* plant of claim 11, wherein said protein comprises SEQ ID NO: 47.

13. The transgenic *Glycine max* plant of claim 10, wherein said plant active promoter has at least 95% sequence identity across the full length of SEQ ID NO: 7.

14. The transgenic *Glycine max* plant of claim 13, wherein said promoter comprises SEQ ID NO: 7.

15. The transgenic *Glycine max* plant of claim 2, wherein said polynucleotide comprises a nucleotide sequence having at least 90% sequence identity across the full length of SEQ ID NO: 6.

16. The transgenic *Glycine max* plant of claim 15, wherein said polynucleotide comprises a nucleotide sequence having at least 95% sequence identity across the full length of SEQ ID NO: 6.

17. The transgenic *Glycine max* plant of claim 15, wherein said polynucleotide comprises a nucleotide sequence having at least 98% sequence identity across the full length of SEQ ID NO: 6.

18. The transgenic *Glycine max* plant of claim 2, wherein said *Glycine max* plant is an elite *Glycine max* plant.

19. The transgenic *Glycine max* plant of claim 11, wherein said *Glycine max* plant is an elite *Glycine max* plant.

20. The transgenic *Glycine max* plant of claim 16, wherein said *Glycine max* plant is an elite *Glycine max* plant.

21. The method of claim 6, wherein said polynucleotide encodes a protein having at least 95% sequence identity across the full length of SEQ ID NO: 47.

22. The method of claim 6, wherein said polynucleotide encodes a protein having at least 98% sequence identity across the full length of SEQ ID NO: 47.

23. The method of claim 6, wherein said polynucleotide comprises a nucleotide sequence having at least 90% sequence identity across the full length of SEQ ID NO: 6.

24. The method of claim 6, wherein said polynucleotide comprises a nucleotide sequence having at least 95% sequence identity across the full length of SEQ ID NO: 6.

25. The method of claim 6, wherein the plant active promoter comprises a nucleotide sequence having at least 95% sequence identity across the full length of SEQ ID NO: 7.

26. The method of claim 21, wherein the contacting comprises transforming the recipient *Glycine max* plant cell with the heterologous nucleic acid molecule.

27. The method of claim 22, wherein the contacting comprises transforming the recipient *Glycine max* plant cell with the heterologous nucleic acid molecule.

28. The *Glycine max* seed of claim 3, wherein said protein has at least 95% sequence identity across the full length of SEQ ID NO: 47.

29. The *Glycine max* seed of claim 28, wherein said protein has at least 98% sequence identity across the full length of SEQ ID NO: 47.

30. A method of controlling Asian Soybean Rust (ASR) in a field comprising the step of planting in the field a transgenic *Glycine max* plant having stably incorporated into its genome a heterologous nucleic acid molecule comprising a plant active promoter operably linked to a polynucleotide encoding a protein having at least 90% sequence identity across the full length of SEQ ID NO: 47, wherein expression of said protein in said *Glycine max* plant enhances resistance of the plant to ASR compared to a control *Glycine max* plant not expressing said protein.

31. The method of claim 30, wherein the protein has at least 95% sequence identity across the full length of SEQ ID NO: 47.

32. The method of claim 31, wherein the protein has at least 98% sequence identity across the full length of SEQ ID NO: 47.

33. The method of claim 30, wherein the polynucleotide comprises a nucleotide sequence having at least 90% sequence identity across the full length of SEQ ID NO: 6.

34. The method of claim 33, wherein the polynucleotide comprises a nucleotide sequence having at least 95% sequence identity across the full length of SEQ ID NO: 6.

35. The method of claim 30, wherein the plant operable promoter comprises a nucleotide sequence having at least 95% sequence identity across the full length of SEQ ID NO: 7.

36. The method of claim 30, wherein the transgenic *Glycine max* plant is an elite *Glycine max* plant.

37. The method of claim 31, wherein the transgenic *Glycine max* plant is an elite *Glycine max* plant.

38. The method of claim 32, wherein the transgenic *Glycine max* plant is an elite *Glycine max* plant.

* * * * *